US 9,904,886 B2

(12) United States Patent
Glaser

(10) Patent No.: US 9,904,886 B2
(45) Date of Patent: Feb. 27, 2018

(54) METHOD OF IDENTIFYING, LOCATING, TRACKING, ACQUIRING AND SELLING TANGIBLE AND INTANGIBLE OBJECTS UTILIZING PREDICTIVE TRANSPOSE MORPHOLOGY

(71) Applicant: Lawrence F Glaser, Fairfax Station, VA (US)

(72) Inventor: Lawrence F Glaser, Fairfax Station, VA (US)

( * ) Notice: Subject to any disclaimer, the term of this patent is extended or adjusted under 35 U.S.C. 154(b) by 0 days.

(21) Appl. No.: 15/016,824

(22) Filed: Feb. 5, 2016

(65) Prior Publication Data

US 2016/0232437 A1    Aug. 11, 2016

Related U.S. Application Data

(60) Provisional application No. 62/113,326, filed on Feb. 6, 2015.

(51) Int. Cl.
*G06K 7/10* (2006.01)
*G06K 19/07* (2006.01)

(52) U.S. Cl.
CPC ..... *G06K 19/0727* (2013.01); *G06K 7/10227* (2013.01); *G06K 7/10237* (2013.01); *G06K 7/10297* (2013.01); *G06K 2007/10524* (2013.01)

(58) Field of Classification Search
CPC ........... G06K 19/0727; G06K 7/10237; G06K 7/10297

USPC ............... 235/487, 492, 439, 462.13, 462.41
See application file for complete search history.

(56) References Cited

U.S. PATENT DOCUMENTS

| | | | | |
|---|---|---|---|---|
| 5,382,784 A * | 1/1995 | Eberhardt | ............ | G06K 7/0004 235/383 |
| 5,493,107 A * | 2/1996 | Gupta | ............ | G06K 1/121 235/375 |
| 6,415,978 B1 * | 7/2002 | McAllister | ............ | G06K 7/0004 235/462.01 |
| 7,055,750 B2 * | 6/2006 | Carrender | ............ | G06K 7/0004 235/375 |
| 7,360,714 B2 * | 4/2008 | Sano | ............ | G06K 1/121 235/462.01 |
| 7,772,964 B2 * | 8/2010 | Tethrake | ............ | G06K 1/18 235/462.01 |
| 8,496,166 B2 * | 7/2013 | Burns | ............ | G06K 5/02 235/375 |
| 8,836,480 B2 * | 9/2014 | Wilfred | ............ | G06K 19/06056 340/10.1 |
| 2002/0113127 A1 * | 8/2002 | Takeuchi | ............ | G06K 7/0004 235/462.25 |
| 2002/0113707 A1 * | 8/2002 | Grunes | ............ | G06F 17/30879 340/572.1 |
| 2002/0185532 A1 * | 12/2002 | Berquist | ............ | G07G 1/0045 235/385 |

(Continued)

*Primary Examiner* — Paultep Savusdiphol
(74) *Attorney, Agent, or Firm* — Leslie Virany

(57) ABSTRACT

The present invention causes an active display or the adapter driving the display to emit RFID formatted QR code information (or bar code information) in sync with displayed QR or Bar codes to allow portable devices in reasonable proximity to acquire the QR code data without physical scanning, without taking a picture and without taking a video, allowing for a fully automated QR code acquisition system.

18 Claims, 2 Drawing Sheets

(56) References Cited

U.S. PATENT DOCUMENTS

| | | | |
|---|---|---|---|
| 2005/0218219 A1* | 10/2005 | Sano | G06K 1/121 235/383 |
| 2006/0081713 A1* | 4/2006 | Carrender | G06K 7/0004 235/462.46 |
| 2006/0213989 A1* | 9/2006 | Ahmadi | G06K 7/0004 235/440 |
| 2008/0087727 A1* | 4/2008 | Jenney | G06K 1/18 235/385 |
| 2009/0309736 A1* | 12/2009 | Heurtier | G06K 19/041 340/572.8 |
| 2010/0038428 A1* | 2/2010 | Chen | G06K 7/0004 235/462.25 |
| 2010/0287057 A1* | 11/2010 | Aihara | G06K 7/1095 705/16 |
| 2011/0289023 A1* | 11/2011 | Forster | G06K 19/07703 705/500 |
| 2012/0130851 A1* | 5/2012 | Minnick | G06Q 30/0633 705/26.8 |
| 2013/0024221 A1* | 1/2013 | Fisher | G06Q 20/20 705/5 |
| 2013/0048711 A1* | 2/2013 | Burns | G06K 5/02 235/375 |
| 2014/0173657 A1* | 6/2014 | Afentakis | H04N 21/8173 725/40 |
| 2015/0213292 A1* | 7/2015 | Sun | G06K 7/0004 235/440 |

\* cited by examiner

METHOD OF IDENTIFYING, LOCATING, TRACKING, ACQUIRING AND SELLING TANGIBLE AND INTANGIBLE OBJECTS UTILIZING PREDICTIVE TRANSPOSE MORPHOLOGY

BACKGROUND

RFID tagging of an object is known, for example:
U.S. Pat. No. 7,295,132 Steiner
U.S. Pat. No. 7,843,334 Kumagai
U.S. Pat. No. 8,371,503 Gazdzinski Generally, if one views an object, a fixed image on medium such as on paper or on an active display or a video, it has become common to find a QR or Bar code on the object one is viewing, or found within an image on a display. Previously, to acquire the data associated with the QR or Bar code, one has to take additional steps, such as scanning, taking a camera photo or other physical means, even though many devices and cell phones are now NFC (Near Field Communications) capable.

Also, using Google or other search engines have offered little for consumers which is genuinely new, as evidenced by the loading of browser marketing vehicles with server-side resources. Merchants would not risk burdening their customers if they had profitable options which produced sales while not burdening their customers.

US #20140074696 is incorporated herein by reference in its entirety for purposes of essential subject matter.

U.S. patent application Ser. No. 14/996,290 is incorporated herein by reference in its entirety for purposes of essential subject matter.

SUMMARY

The present invention overcomes these and other problems of the prior art by providing RFID outputs associated with objects, images or videos. The RFID tagging of an object may include large blocks of data such as a map of the object inside the RFID. Users may now automatically acquire data about objects they have seen over the course of a physical trip. In embodiments, audible and tactile (rumble) means are provided so the user is aware they have acquired data on an object, image or video they have come in close proximity to a given user's day trip to look at cars could result in, for example, 10-20 brochures and URLs being automatically present in their cell phone and the knowledge that this has happened as desired, without ever having to take out the cell phone. The data is later reviewed as the user wanted to spend the time, for example, looking at cars, not playing with and dropping their cell phone. Eg to take QR scans and then review the info repeatedly, this is no longer necessary.

This is an enhancement to the emerging "Internet of Things" which is discussed further below.

A feature of the invention is relating data found inside one species, such as a QR code or Bar code and convert it to another species and broadcast it upon query. So, a user's cell, coming close enough to a monitor to assume the user of the cell can see the monitor, causes any QR or Bar code displayed on the monitor to be auto captured without any need for the user having to scan, pic or vid the screen. A familiar Jingle may be audible emitted by the speakers associated with the screen or by the user's device along with a rumble, to demonstrate to the user they have acquired the data associated with what they are close to. Consequently, the present invention overcomes the problems of the prior art by, inter alia, relating display data to rfid data to text data to a pic of a QR or Bar, to any applicable URL and then point out that the RFID, being electronic and having memory, could provide more details stored within the rfid and selectively output through its data stream. This is applicable to further standards as they are developed, such as to develop a more complex form of machine coding for printing on objects or their packaging, or both.

It is an object of the invention to provide info about what a user saw or was looking at. Unlike the prior art, which requires that, if the user wants general info on tangibles and intangibles not in front of the user, he must access a search engine on a network and type in his interest/terms and waste time and energy to obtain and then further explore the resulting hits, the present invention is automatic.

It is an object of the invention to work from any species of data to any species of data, automatically, wherein local devices can share data automatically through any wireless means or wire based means, relying on RFID proximity detection or other wireless local detection means, and then, transfer of the data based first on proximity and next on allowances and filters.

It is a further object of the invention for the host device, that which the user carries and that which serves as a source of information, upon receiving the information, the device attempts to search through its own local data base or any other search function available to the device to find other species of data to which the initial data relates.

It is an object of the invention for the user to be able to pass QR code automatically via proximity to another such device or a stationary device equipped according to this invention.

It is an object of the invention to be as simple and automatic as a user relaxing and watching cable with cell on. The next day, the user remembers an ad seen and sure enough, its data, or a pointer to its data, is stored locally on the user's cell phone. How did the cell capture the data? RFID parallel broadcasting according to this invention. These and other advantages of the present invention are described below in detail. The invention provides a new mechanism to enable an Internet of things experience and a new search methodology that the prior art has failed to provide. For example, searching limited to that which the user has observed (a lifetime data base of that which the user has observed) so as to find anything of interest the user recalls having witnessed.

For purposes of this document, a user's device may be referred to as cell-phone, mobile device, smart-phone, portable device, wearable device or similar well-known expressions, which are used herein interchangeably unless otherwise noted. These, however, could also include tablets, PCs, laptops and other portable and stationary electronic devices. Stationary devices make sense to include for reverse use of the invention when standing before a stationary electronic device such as a desk top PC.

For purposes of the present invention, a species of data refers to the various commonly-used types of data representation. For purposes of the present invention, a "map" of an object refers to a complicated representation of the object including internal schematics of the object and calibrated proportions with legend to determine true size of the actual tangible object.

For purposes of the present invention, "identification means" or "identification data" refers to information, coded or otherwise, used to point to objects or specific web sites or pages for purpose of taking a user of a device, which may be a mobile device, to a destination point they have requested. A non-limiting list of examples include RFID tags, QR codes, Barcodes, plain text, Uniform Resource Locators and the like. (URLs)

For purposes of the present invention, "transpose," and similar words based on the same root, refer to the act of establishing a relationship between identification data, such as for example a QR code being displayed, and its RFID counter-part, or vice-versa.

DESCRIPTION OF THE INVENTION

Figure 1:
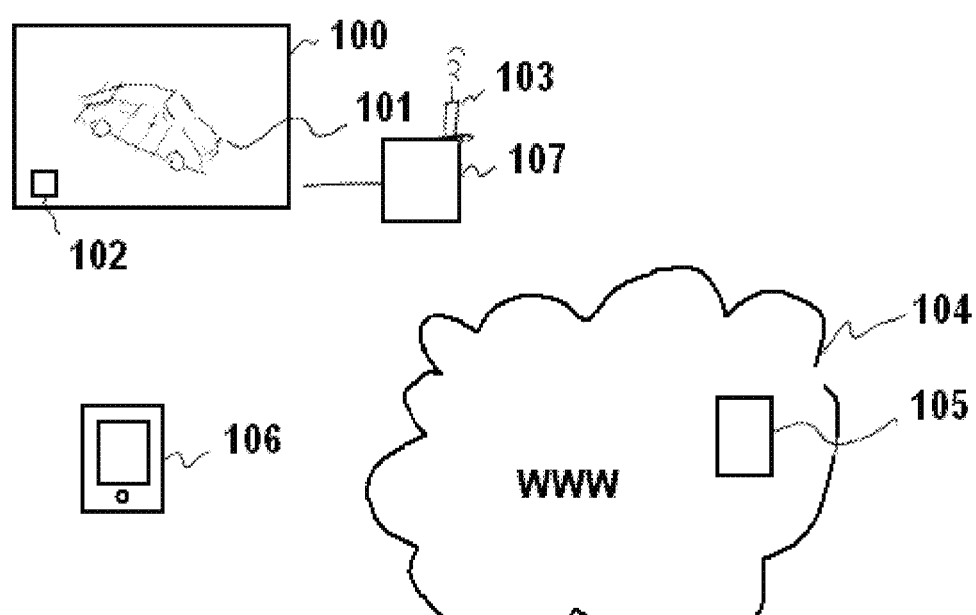
FIG. 1 shows the present invention.

Referring to FIG. 1, an application is present on the cell phone which also runs on servers, within the WWW 104 and on the machine driving the display 100. The application performs predictive transposing of information by PC 107 into a single block of information which can then be moved automatically from within a displayed QR code or other coded region 102, to an RFID 103 transmission which is transmitted and received by a compatible device 106 such as, by way of example, the cell phone, equipped accordingly. It is noted that an object depicted on a display may not be visibly coded on the object, nonetheless, there may still be specific data associated with the object which is output through the RFID transmission and received by the compatible device.

Since what is put in the RFID in terms of data could be pretty hefty . . . eg 3-D Cad Cam drawing of object. RFID chip could know its own position on the object stored in its memory so as to guide a user where the item goes, such as a part from a car engine. RFID-sturdy electronics which stands up to heat or any other extremes is an improvement that would allow for more RFID tagging of objects that is lasting and permanent.

In accordance with the present invention, to keep lists of these transpose morphs, we can search on any one aspect and hit the thread, which means, a single search will get more and better hits than (say) Google. When the cell phone 106 receives the QR code, it can reconstruct the same QR pattern with no error. The Cell Phone can also take the user to the (front page of the) associated URL 105 by way of the QR data, automatically if desired. Because the forms of data can be converted to and from any standard, even standards not yet written (assuming any new standard still uses text and alpha-numeric coding) the application can morph any data from one format to another with complete automation.

RFID tags, QR codes, Barcodes, plain text, Uniform Resource Locators (URLs), these are examples of identification means or identification data used to point to objects or specific web sites or pages for purpose of taking a given user to a destination point they have requested. Users may also be looking at the destination point or object and need more information to then transact or learn more about a given subject matter or destination point.

For purpose of enabling more applications which function automatically, this invention unifies the morphology of a tagged item (or specific subject such as a web page, photo, video), its associated QR or Bar code (or any other object associated coding, visible or invisible), RFID tags, text, any URL associated with the item. The purpose of the morphology association is to provide automatic conversion and to enhance search. To better understand how this manifests in an improvement over prior art, consider, I view an advertisement 101 from a distance, such as an ad on a movie screen at a theater. My cell is silent. I am not going to lift it to try to take a picture of the QR code displayed on the screen, or say from a fixed poster.

The reason I do not have to do this is, according to this invention, the local WiFi or the actual movie Screen is modified to emit the QR or bar coding via a standard data format found within an RFID tag. Because RFID has evolved into MFQRFID (Multi-Frequency, highly directional) my Cell Phone can have within an application, an entire stack of QR codes I have come close to in my travels inclusive of a map to remind me where I was. By simply scrolling down the QR codes, information is instantly available such as related web pages, location of the object I am interested in and more.

In accordance with a preferred embodiment of the present invention, the host device, that which the user carries and that which serves as a source of information, upon receiving the information, the device attempts to search through its own local data base or any other search function available to the device to find other species of data to which the initial data relates. Conversion according to algorithm is also intended. For example, if a received QR code included a URL, the URL is broken out as a text string and is automatically available for pasting to a search engine to perform a search or to go to the URL site, for the user and such that the user may not have to execute a command, or the user has to take the minimum mandatory number of steps to reach the URL site.

The idea of the present invention is to equip objects and devices with powered RFID output capability which is re-programmable, for example, in a series of embodiments, an active movie screen, (based on the principles disclosed in US #20140074696, which is incorporated herein by reference) having a mixed array of light-emitting and light-detecting pixels which can enable the emission of infinite QR code data formatted into RFID channels, in real time. If I sit down to watch a movie and 32 ads appear in succession, even when 2 or more QR codes are displayed at the same time, my Cell and its associated application captures the whole stack for my perusal later on. A user does not have to scan or take a picture of the QR or Bar code at all. This does not preclude my application from scanning, taking a picture or a video to acquire the QR or Bar code, but obviously, automatic acquisition of the information without having to do anything at all, is preferable and superior.

Displays, as found on all devices intending to take advantage of this invention, have RFID emitters and the display adapter is capable of being flagged with a delimiter in the display data to know a QR code is being displayed, and then transpose it to its RFID counter-part. Hence the Transpose-Morph argument. The TRANSPOSE MORPHOLOGY is equivalent to saying I can take any text or QR code and link it permanently to a URL. If I am Nike, I do this for my company, products and then a specific model of shoe. If you get the QR in your cell, you get the whole 9 yards of info about it. In an embodiment, the invention polices what pops up. It should be obvious to those of skill, the encoding of the Qr or Bar or any new encoding method will involve unique identifiers for the whole of the code, and portions within the code when properly truncated can eludicate further specific information. That a standard evolves for this truncation or does not evolve, matters not as the very standard to be used to break apart the information could vary with each code and be embedded in the code. Or, a universal standard could be developed and deployed for knowing what part of a unique code in the context of this invention (a single code emitted and received to now be interpreted) represents the actual manufacturer as opposed to the model number of the object and so forth.

In an embodiment, the present invention is operated by way of an application such as a Cell Phone "app.". All other data associated with the QR code and thus with an object, ad, web site or other such subject is instantly organized for the user such that s/he can learn more about the object, ad or "website in question" at his or her leisure and without any extra effort on the user's part needed to acquire and organize the code. So, as an example, a user walks through a museum and all displays that come within X feet provide a "jingle" on the user's Cell Phone, who then knows it has acquired the data including the ability to look at the display of the device and see confirmation and data showing indeed, the information has been captured. Again, the user can program settings to have alerts or not, to filter objects by class, definition or other parameters, or to not filter and so on. All logical attributes will be able to tailor through settings of this nature. The user could also have settings arranged in groups so they can cull through and select settings for such places as a movie, museum, airport, mall and so forth.

Figure 2:
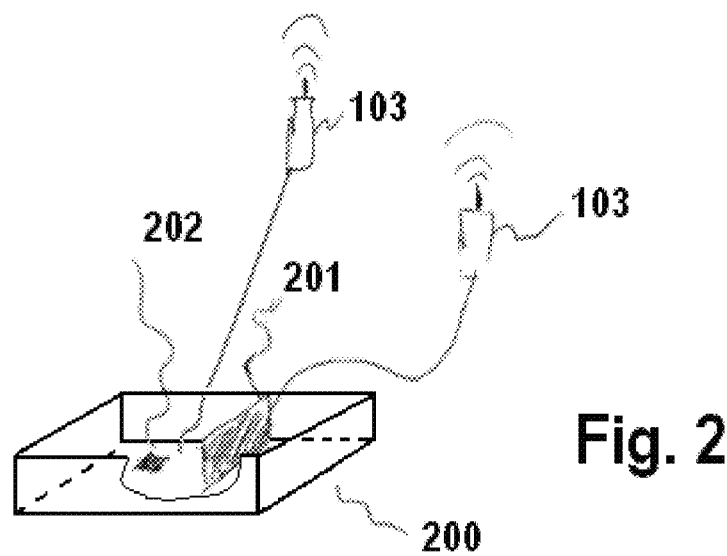
FIG. 2 shows a display adapter for use with the invention as depicted in FIG. 1.

Referring to FIG. 2, a display adapter is shown with a dongle to a powered RFID. 200 is a PC, 103 is repeated as the RFID, 201 is a third party add on display adapter and 202 is a resident chip on the motherboard serving as the display adapter. One skilled in the art would recognize that the cord coming out to attach the RFID to the PC is adapted in the appropriate manner. It is noted other wireless systems such as Bluetooth or WiFi could be used effectively to accomplish the same net sum effect.

In embodiments, audible and tactile (rumble) means are provided so the user is aware they have acquired data on an object, image or video they have come in close proximity to, without having to remove the device they are using for the data acquisition (cell phone) from their pocket or purse. These data are stored as long as the user desires and can be searched, data mined and viewed later. The data can also be drawn upon to automate further actions, such as go out on the WWW and view a URL associated with a given RFID data block received. Filters will be made available at all levels covering all logical operands to make the user's experience better, culling out classes of objects not of interest, for example. Given the right capacity, services, settings and filters, a given user's day trip to look at cars could result in 10-20 brochures and URLs being present in their cell phone and the knowledge that this has happened as desired, without ever having to take out the cell phone. These data could be automatically shared with a personal timeline service, such as Mem Tag, as disclosed in the present inventor's US#20150310060, which is incorporated herein by reference.

if a user's cell-phone receives the RFID data for an object, the user can acquire a map of the object, either slices, or 3-D. Slices may be preferable because they use less memory and so they transfer quicker. A 3-D cad cam depiction uses much more memory. So despite focusing on morphology and relating data across the various boundaries, the present invention also gets RFID tags to do more.

In brevity, the cell phone being carried by the user may receive these QR codes within X feet proximity of the display and simple store them for the user to review at any time. A jingle or vibration (or both) as well as an illuminated pattern may be emitted if desired, for each received data block. A jingle in particular could serve as a unique identifier by emitting a unique aural jingle and the display from which the data block originated could also emit the same jingle through its associated speakers, if equipped, just as transmission is implemented. In simplistic terms the user hears "ding dong" in a specific pattern and pitch from the display they are viewing and about 1 second after, their cell phone emits the same sound as if echoing the screen's audible emission. The user then knows the data block passed successfully and they need not take their cell out of its case. The data blocks are stacked chronologically, with an option to sort on any logical operand the user wishes. The same series of actions may also work in reverse, from the Cell Phone to nearby devices, either with a command issued within proximity of a display, or, automatically.

The device, in an embodiment, then has filters to ignore certain subjects or classes of information so as to truncate the list and save review time later. A walkthrough the grocery store aisle where spices are displayed will provide only data for Sage, if the user sets the filter to Sage and Spice only. The user then will not miss the various brands and their reviews, but the experience is fully automated, and the search function is both automated and more advanced and complete. By simply walking through an area, the user creates a localized "Internet of Things" experience with a wholly complete and reliable search function.

Filters are going to prove to be important and necessary to cull the amount of information stacked up during the course of a day. Filters can ignore certain subjects or regions so the user's device is less disturbed with jingle emissions. All features can be set up in the user's settings with custom logic filters on every attribute. So, if the user is really interested in sports shoes they can filter all else and only get jingles for sports shoes, or, at a discount of at least 33%, or Nike, or any logical combination.

Referring again to FIG. 1, 100 is a display or a projection, 101 is an advertisement or fixed image, 102 is a machine code region such as a QR code, 103 is an integrated and powered bi-directional RFID, 104 is the www, 105 is the front page for a given URL within the WWW, 106 is a cell phone equipped with RFID and for full compatibility with the invention the RFID is powered and bi-directional.

It may be preferable for the PC or Display Adapter to serve as the gleaning point and driver of the powered bi-directional RFID. In another embodiment, the QR code can be gleaned from a video signal, for example in the case where user is watching TV. In a further embodiment, QR code associated with Video Signal and received out of band The invention intends to simplify the process of keeping track of information about what a user saw during a given period of time for which they may have interest, or, they wish to keep a library for future reference which may be searched and data mined.

In an embodiment, the invention enables the user to pass QR code automatically via proximity to another such device or a stationary device equipped according to this invention. So rather than the user scanning a QR code on a display, the user could also place a QR code and other data associated with the QR code on to their device' display for others to view and to scan if they lack the equipment necessary to gather the data through RFID.

Because full automation is enabled with this invention, the user has peace of mind the information they may later desire about objects or images they came into contact with during the course of a given period of time will be present in their stack. This requires an object displayed to have the display or its host computer equipped with the powered bi directional RFID or another wireless standard.

In an embodiment, during transmission, the device of the present invention indicates to the sending device that further transmission is not needed as the rest of the associated data is available through other means. by way of example, once a user's receiving device has the unique identifier, it can check through other network attachments, such as 5G, which is anticipated to be available soon, and finding, as much as possible, associated data is accessible for the user for that object, eliminating the need to send more data along slower RFID pathways?

Once transmission starts, if a user's settings, for example, get all data about am object, still, if that complete data is available through the 5G net, no way would you want to download through a local wireless RFID connection. As soon as a unique identifier has been passed, the device of the present invention has the capability to signal to the RFID "STOP" and it can gather the data that completes the settings in the device, through the 5G connection. In embodiments, an additional feature of the invention is to leave a biometric tag or trace within the RFID itself, so the object knows you were there. This feature might be dubbed the "Hansel and Gretel" feature.

A transposition, for purposes of this invention, denotes the idea of truncating anything where the pieces still add to the whole and a human or computer program can analyze the pieces and reconstruct the whole from which the pieces were taken. Most used is to transpose one form into a different form without leaving any loose ends. Examples, as stated above, include transposing QR or bar codes into numeric codes, or vice-versa. A relational data base, in embodiments, keeps and tracks these transpositions. In other embodiments, images, schematics, brochures, URLs and the like can be related to any of the transpososintions A morphology, for purposes of this invention, assumes a thing which is certain, like a number. In accordance with embodiments of the invention, it is transformed (morphed) it into an image, with the aid of a relational data base.

A Transpose Morphology, for purposes of this invention, benefits from rich data base relationships, to better morph to another form, such as from a number to bar code to url to correct image.

Predictive, for purposes of this invention, means using the relational data base's rich set of connections, allows a user's app on a cell or laptop can get only the data needed for all the features the user activates. This eliminates the need to get, for example, 500 TB of data if an app only calls for 2 TB and a typical user, per established usage characteristics, may use only 500 MB of that typically. On the other hand, for example, if a user's settings characterize him or her as an "always wants to see the picture" kind of person, then the app downloads images first. If setting specify, for example, spec sheets, a URL with spec sheets downloads first for such a user. Other users, it would predict differently.

Those experienced in the field of this invention should, based on the detailed descriptions of the objectives and new methods, be able to understand the logical possible variations. They will be able to adopt appropriate strategies depending on the various applications and needs of video, RFID and smartphone devices, not specifically shown in this application, but within the general goals and objectives of this invention.

For example, the RFID can attach a number of ways when a host device needs to be modified to have wireless output because the PC motherboard is a multi port host, such as, for example, USBs, Ethernet or Proprietary. Examples of advantageous connections include coax, twisted pair and fiber optic.

Furthermore, although in the present document the use RFID as a primary means of wireless communications, it is not intended to be limiting in that WiFi can serve the same purpose as can BlueTooth or other wireless networks. A concept discussed elsewhere (U.S. patent application Ser. No. 14/996,290) by the present inventor, called MFQRFID (Multi-Frequency and SSBRFID Single Side Band RFID) provides yet another different method of wireless communications which includes distance and vector data which is more accurate than RFID alone.

Examples disclosed are intended to be limiting only as reflected in the appended claims.

The invention claimed is:

1. An adapter for a digital display comprising
an RF transmitter
a processor
capturing means
wherein
  said digital display displays at least one image comprising information delivered by said processor, said information identifying an object or service intended for transaction
  said capturing means captures said information from said processor and further delivers said information in RFID format to said RF transmitter
  said capturing means captures said information optically from said display
  said display comprises a mixed array of light-emitting and light-detecting pixels integral to at least the portion of said display means displaying said at least one image and wherein said capturing means consists of said light-detecting pixels.

2. The adapter of claim 1 wherein said information comprises QR code or bar code information substantially in sync with QR or Bar codes contained in said at least one image and wherein said information in RFID format is adapted for acceptance by portable devices as QR or barcode acquisition.

3. The adapter of claim 1 wherein said information is gleaned from a video signal which is driving said digital display.

4. The adapter of claim 3 in a form selected from the list of dongle, a third party add on, or a resident chip.

5. The adapter of claim 3 wherein a portion of said information is received out of band.

6. A method of acquiring transaction data pertaining to an object or service onto a mobile device comprising steps of;
  receiving user attribute information from said mobile device, said user attribute information identifying said mobile device at least as a subscriber, through prior agreement, of a data transpose service conveyed by an adapter
  delimiting display data with a flag signifying that an identification data code is being displayed, and then transposing it to its RFID counter-part, said code being selected from a list consisting of RFID tags, QR codes, Barcodes, plain text, and Uniform Resource Locators (URLs), wherein said capturing means comprises detection pixels embedded in said display means.

7. The method of claim 6 wherein said identification data code is a QR code.

8. The method of claim 6 further comprising wherein said step of acquiring is automatic.

9. The method of claim 8 further comprising transposing said identification data into a single block of information and moving said transaction data automatically from within said identification data code, to an RFID transmission which is transmitted and received by a compatible device.

10. The method of claim 9 further comprising automatically navigating on a browser loaded on said mobile device to a URL associated with said identification data code.

11. The method of claim 10 further comprising providing morphology association with automatic conversion to enhance search.

12. The method of claim 10 further comprising instantly organizing at least a portion of said transaction data.

13. The method of claim 6 further comprising wirelessly communicating distance and vector data to said RFID.

14. The method of claim 13 further comprising storing position data pertaining to an object in an RFID chip memory connected to said object.

15. The method of claim 13 further comprising modifying a local WiFi router or actual display hardware to emit said identification data code via a standard data format compatible with said RFID tag.

16. The method of claim 13 further comprising providing an audible, tactile, or visible alert on said mobile device for said displays that come within a certain distance.

17. The method of claim 16 further comprising filtering to ignore certain subjects or regions so the user's device is less disturbed with said alerts, said filtering being set up in the user's settings.

18. The method of claim 6 wherein said transaction data further comprises biometric identification.

* * * * *